US012695835B2

(12) United States Patent
Watanabe

(10) Patent No.: US 12,695,835 B2
(45) Date of Patent: Jul. 28, 2026

(54) IMAGE FORMING APPARATUS CONFIGURED TO DETERMINE WHETHER TO EXECUTE A TAG PROCESS

(71) Applicant: Toshiba Tec Kabushiki Kaisha, Tokyo (JP)

(72) Inventor: Yasuhiko Watanabe, Chigasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 259 days.

(21) Appl. No.: 18/582,512

(22) Filed: Feb. 20, 2024

(65) Prior Publication Data

US 2024/0414273 A1 Dec. 12, 2024

(30) Foreign Application Priority Data

Jun. 9, 2023 (JP) ................................. 2023-095434

(51) Int. Cl.
| *H04N 1/46* | (2006.01) |
| *G03G 15/00* | (2006.01) |
| *G06K 17/00* | (2006.01) |
| *H04N 1/00* | (2006.01) |

(52) U.S. Cl.
CPC ..... *H04N 1/00342* (2013.01); *G03G 15/5016* (2013.01); *G03G 15/5091* (2013.01); *G03G 15/6502* (2013.01); *G06K 17/0025* (2013.01); *H04N 2201/3269* (2013.01)

(58) Field of Classification Search
CPC .......... H04N 1/00342; H04N 1/32138; H04N 2201/3269; G03G 15/5091; G03G 15/6502; G06K 17/0025

USPC ................. 358/1.15, 1.13, 1.14; 399/45, 366
See application file for complete search history.

(56) References Cited

U.S. PATENT DOCUMENTS

| 6,827,279 B2 | 12/2004 | Teraura |
| 7,072,593 B2 | 7/2006 | Negishi |
| 2006/0038844 A1 | 2/2006 | Kiwada et al. |

FOREIGN PATENT DOCUMENTS

| JP | 2004223966 A | * | 8/2004 |
| JP | 2005-305662 A | | 11/2005 |
| JP | 2006-056014 A | | 3/2006 |
| JP | 2006113190 A | * | 4/2006 |

OTHER PUBLICATIONS

Notice of Reasons for Refusal mailed Feb. 3, 2026 in corresponding Japanese Patent Application No. 2023-095434, 8 pages (with Translation).

* cited by examiner

*Primary Examiner* — Jamares Q Washington
(74) *Attorney, Agent, or Firm* — Kim & Stewart LLP

(57) ABSTRACT

An image forming apparatus includes an image forming mechanism, a wireless tag communication device, a memory that stores information indicating a user in association with an attribute thereof, and a controller configured to acquire a job for forming an image on a sheet using the image forming mechanism, identify a user who has issued the job, determine whether the job includes a tag process for reading or writing data from or to a wireless tag attached to a sheet using the wireless tag communication device, and upon determining that the job includes the tag process, determine whether to execute the tag process based on the attribute of the identified user.

17 Claims, 6 Drawing Sheets

(NON-PRINTING SURFACE)

TP

40

CONVEYANCE DIRECTION

Figure 4:
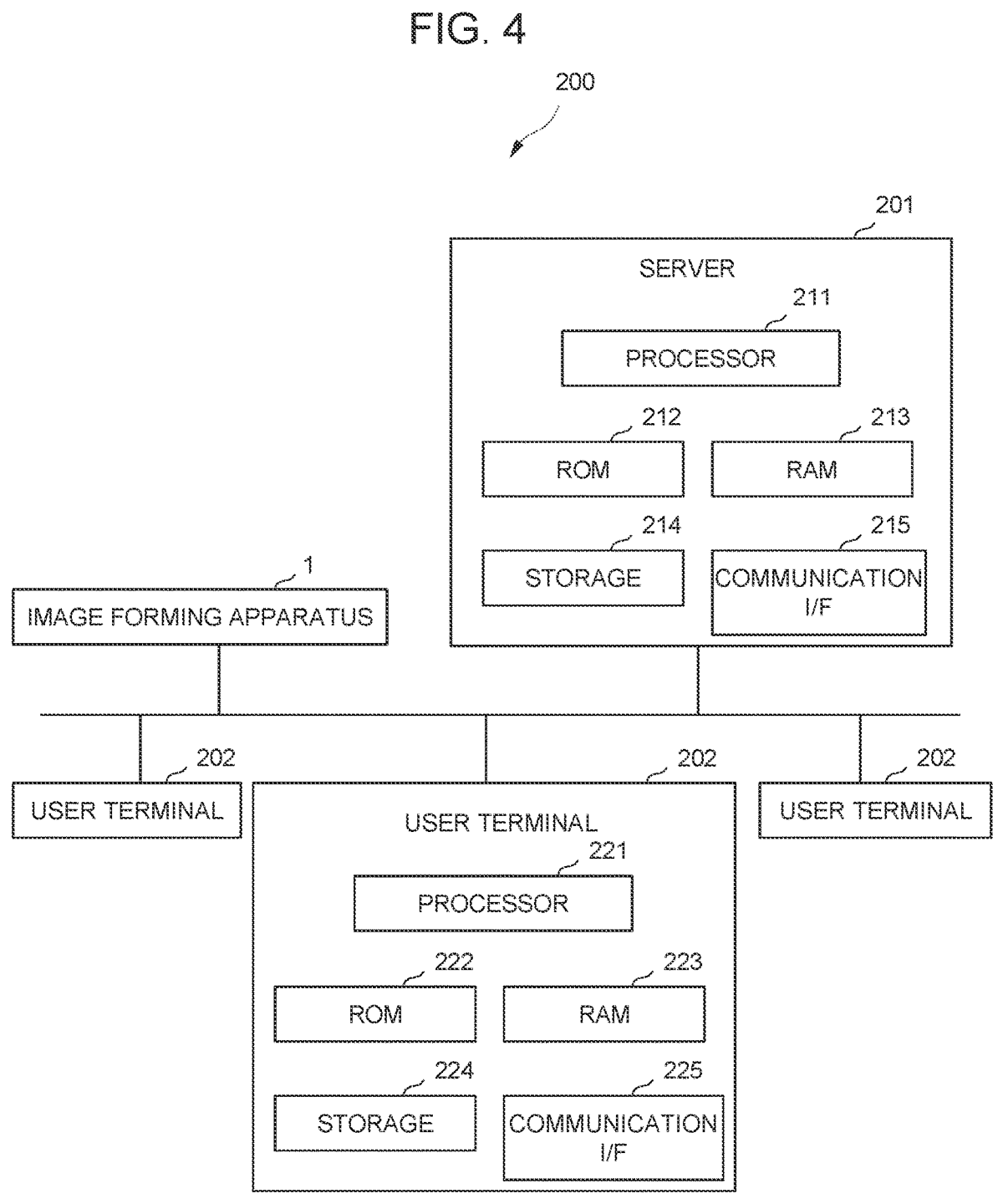

SERVER

211
PROCESSOR

212
ROM

213
RAM

214
STORAGE

215
COMMUNICATION I/F

1
IMAGE FORMING APPARATUS

202
USER TERMINAL

202
USER TERMINAL

221
PROCESSOR

222
ROM

223
RAM

224
STORAGE

225
COMMUNICATION I/F

202
USER TERMINAL

IMAGE FORMING APPARATUS CONFIGURED TO DETERMINE WHETHER TO EXECUTE A TAG PROCESS

CROSS-REFERENCE TO RELATED APPLICATION(S)

This application is based upon and claims the benefit of priority from Japanese Patent Application No. 2023-095434, filed Jun. 9, 2023, the entire contents of which are incorporated herein by reference.

FIELD

Embodiments described herein relate generally to an image forming apparatus, a method performed thereby, and an image forming system.

BACKGROUND

There are image forming apparatuses capable of forming an image on a surface of a sheet. Such image forming apparatuses include multifunction peripherals (MFP), printers, and the like, and some models have a radio frequency identification (RFID) reader/writer that communicates with an RFID tag. The image forming apparatus with the RFID reader/writer is capable of forming an image on a sheet and writing and reading data to and from an RFID tag attached to or embedded in the sheet. Hereinafter, a sheet provided with an RFID tag is referred to as "a tag sheet", and a process of writing and reading data to and from the RFID tag is referred to as "a tag process".

Such an RFID tag is attached to or embedded in a sheet at a predetermined position thereof and is not movable. Therefore, a user needs to set a tag sheet in a sheet feed cassette of the image forming apparatus in the right orientation. However, a user who is not familiar with handling the tag sheet may not be able to set the tag sheet in the sheet feed cassette properly. In such cases, the RFID reader/writer may fail in the tag process, or an image may be formed on an unintended print area that includes the RFID tag.

SUMMARY OF THE INVENTION

Embodiments of the present invention provide an image forming apparatus capable of reducing occurrence of a tag process and an image formation failure on a tag sheet.

In one embodiment, an image forming apparatus includes an image forming mechanism, a wireless tag communication device, a memory that stores information indicating a user in association with an attribute thereof, and a controller configured to acquire a job for forming an image on a sheet using the image forming mechanism, identify a user who has issued the job, determine whether the job includes a tag process for reading or writing data from or to a wireless tag attached to a sheet using the wireless tag communication device, and upon determining that the job includes the tag process, determine whether to execute the tag process based on the attribute of the identified user.

BRIEF DESCRIPTION OF THE DRAWINGS

FIG. 4 is a block diagram of a functional configuration of an image forming system including the image forming apparatus.

DETAILED DESCRIPTION

Hereinafter, embodiments of the present disclosure will be described with reference to the drawings. An image forming apparatus 1 according to an embodiment prevents the use of a sheet feed cassette for storing tag sheets when the user identified by user authentication is a user who is not permitted to execute a print process including a tag process. With such a configuration, the image forming apparatus 1 can prevent, for example, a user who is unfamiliar with handling of the tag sheet from setting the tag sheet in the sheet feed cassette in an incorrect surface or orientation. Further, the image forming apparatus 1 does not execute a tag process when an instruction to execute a copy job is given. With such a configuration, the image forming apparatus 1 can prevent the tag sheet from being used at the time of execution of the copy job in which the tag process is not generally required.

Figure 1:
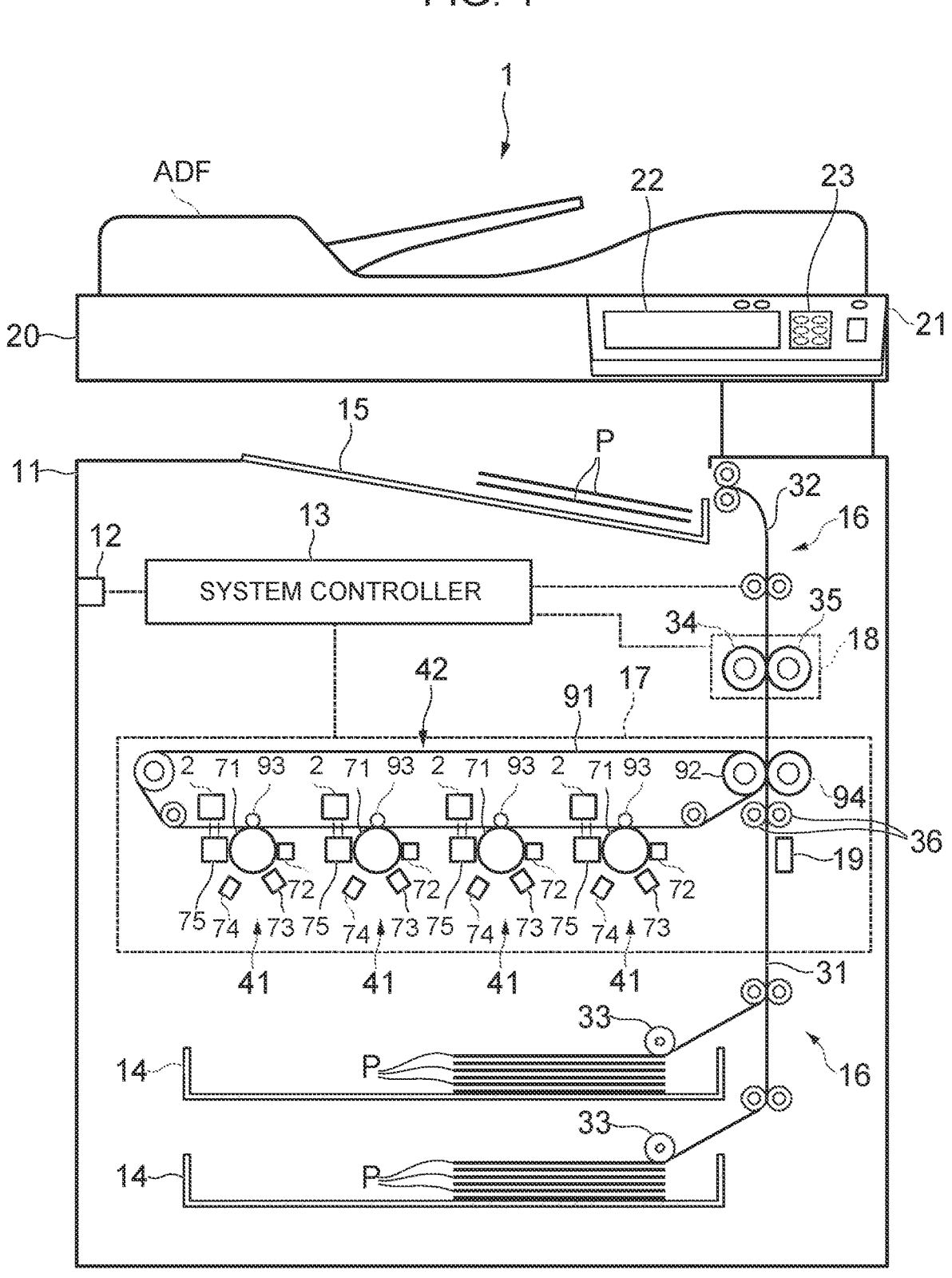
FIG. 1 is an overall configuration diagram of an image forming apparatus according to an embodiment.

Hereinafter, an overall configuration of the image forming apparatus 1 will be described. FIG. 1 is an overall configuration diagram of the image forming apparatus 1. The image forming apparatus 1 is, for example, an MFP including electrophotographic method printers. The image forming apparatus 1 may be a printer. For example, the image forming apparatus 1 is placed in an office workplace.

The image forming apparatus 1 includes an image forming mechanism 17 and a tag communication device 19. The image forming mechanism 17 is an image forming unit or device that forms an image on a regular sheet NP or a tag sheet TP which is a print medium. For example, the regular sheet NP is a typical sheet without an RFID tag. On the other hand, the tag sheet TP is a sheet to which an RFID tag is attached or in which an RFID tag is embedded. The sheet is, for example, a paper or a label sheet. However, the sheet may be any sheet as long as the sheet is made of a material suitable for forming an image on the surface of the sheet by the image forming apparatus. For example, the sheet may be a sheet other than paper, such as overhead projector (OHP) films. Hereinafter, a regular sheet NP and a tag sheet TP are collectively referred to as "a sheet P".

Figure 2:
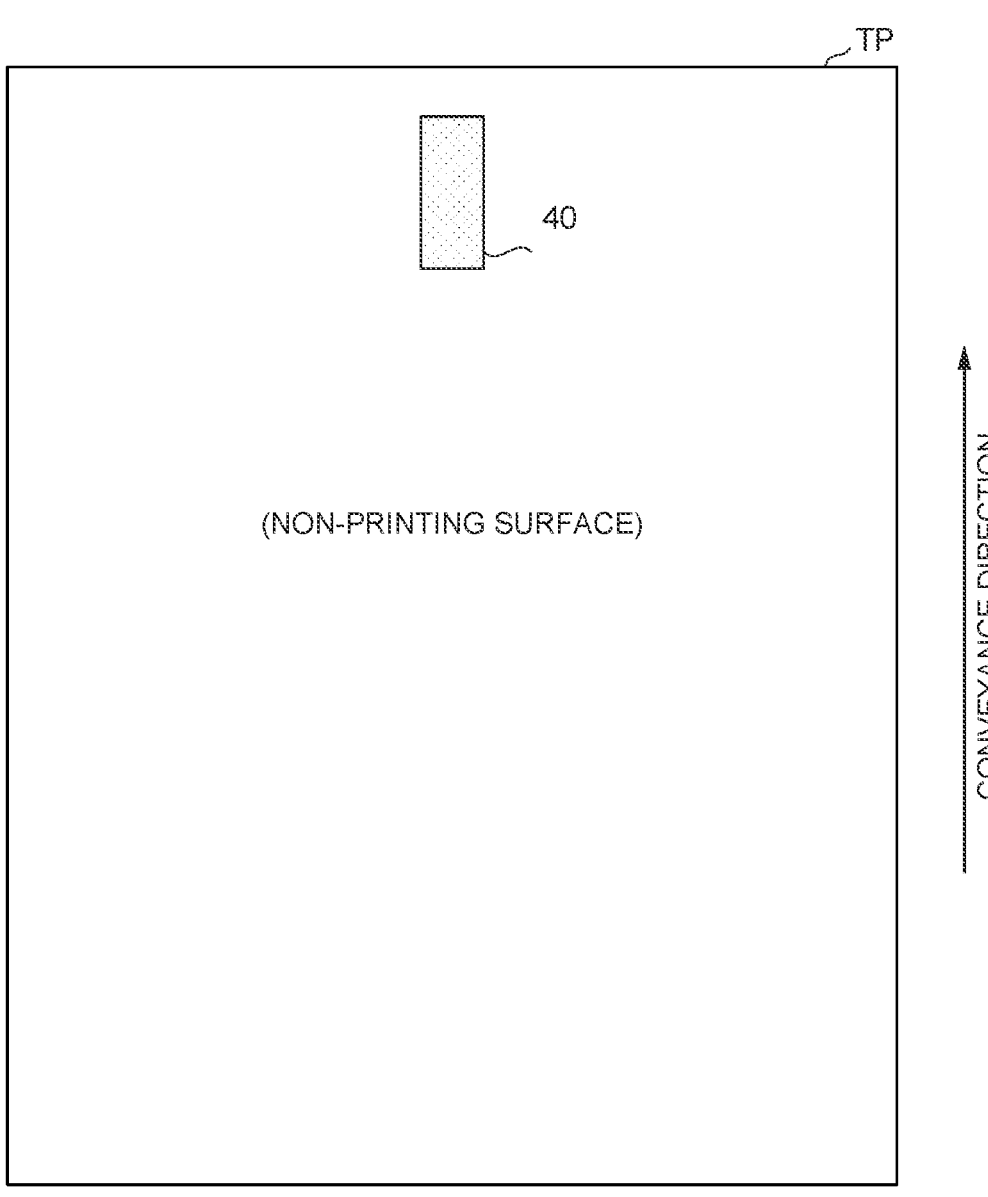
FIG. 2 is an overall configuration diagram of a tag sheet according to an embodiment.

FIG. 2 is an overall configuration diagram of a tag sheet TP according to an embodiment. As shown in FIG. 2, an RFID tag 40 is attached to a non-printing surface (i.e., a back surface) of the tag sheet TP. Further, as shown in FIG. 2, when the conveyance direction is the upward direction of the tag sheet TP, the RFID tag 40 is attached to the upper center of the tag sheet TP. Although the RFID tag 40 can be attached at any position of the tag sheet TP, it needs to be positioned so as to be readable by a tag communication device 19 described later.

The tag communication device 19 is an RFID reader/writer that communicates with the RFID tag 40 provided in the tag sheet TP. As illustrated in FIG. 1, the image forming apparatus 1 includes the tag communication device 19.

However, the configuration is not limited to such a configuration, and the tag communication device 19 may be attached to the outside of the image forming apparatus 1. The tag communication device 19 can be installed at any position as long as it can communicate with the RFID tag 40 of the tag sheet conveyed inside the image forming apparatus 1.

The RFID tag 40 provided in the tag sheet TP is a passive tag that does not have a built-in battery. However, an active tag or a semi-active tag including a battery may be used. The RFID tag 40 provided in the tag sheet TP includes an internal memory, a wireless communication circuit, and an antenna. Alternatively, the RFID tag 40 may include a processor, an internal memory, a wireless communication circuit, and an antenna. The processor is, for example, a central processing unit (CPU). The internal memory includes, for example, a semiconductor memory such as an electrically erasable programmable read only memory (EEPROM) or a random access memory (RAM).

Four memory areas, for example, an EPC memory, a USER memory, a TID memory, and a RESERVED memory, are provided in the internal memory. The EPC memory is an area for storing code information for identifying the RFID tag 40. The USER memory is an area in which the user can freely read and write data. The TID memory is an area written by the manufacturer when the RFID tag 40 is manufactured. The RESERVED memory is an area for storing password information used in the locking function and the disabling function of the RFID tag 40.

The RFID tag 40 communicates with the tag communication device 19 of the image forming apparatus 1. The RFID tag 40 executes a process in response to a command supplied from the tag communication device 19, and responds to the tag communication device 19. For example, when a read command is received from the tag communication device 19, the RFID tag 40 reads the data stored in the internal memory and transmits the read data to the tag communication device 19. When receiving a write command from the tag communication device 19, the RFID tag 40 writes the data received from the tag communication device 19 into the internal memory and transmits the data indicating the write result to the tag communication device 19.

The image forming mechanism 17 shown in FIG. 1 forms an image on a sheet P by electrophotographic printing. However, the image forming method used by the image forming mechanism 17 is not limited to electrophotographic printing. The image forming method used by the image forming mechanism 17 may be, for example, ink jet printing.

The image forming mechanism 17 illustrated in FIG. 1 forms an image to be developed by toner (developer) on a sheet P. The toner may be a single-color toner or a plurality of colors of toner. The toner may be a decolorable toner that can be decolored by heat. FIG. 1 illustrates a configuration example of the image forming apparatus 1 that performs image forming processing using four colors of toner, yellow, magenta, cyan, and black.

As illustrated in FIG. 1, the image forming apparatus 1 includes, in addition to the image forming mechanism 17 and the tag communication device 19, a housing 11, a communication interface 12, a system controller 13, a plurality of sheet feed cassettes 14, a sheet discharge tray 15, a conveyance mechanism 16, a fixing unit 18, a scanner 20, a control panel 21, and the like.

The housing 11 is a main body of the image forming apparatus 1. The housing 11 houses, for example, the communication interface 12, the system controller 13, the sheet feed cassettes 14, the conveyance mechanism 16, the image forming mechanism 17, the fixing unit 18, and the like. The sheet discharge tray 15 is disposed along the upper surface of the housing 11. The image forming apparatus 1 shown in FIG. 1 includes two sheet feed cassettes 14 as an example, but may include three or more. Which of the sheet feed cassettes 14 stores which of the regular sheet NP or the tag sheet TP is predetermined by the user of the image forming apparatus 1.

The communication interface 12 is a communication interface circuit for connecting to a network. The communication interface 12 communicates with an external device connected to the network. The external device is, for example, a user terminal such as a personal computer (PC) that issues a print job, and a server that manages information transmitted and received by communication with the RFID tag 40, a print job, and the like. The communication interface 12 includes, for example, a wired communication interface such as a local area network (LAN) connector. However, the communication interface 12 may be a wireless communication interface that communicates with an external device in accordance with a wireless communication standard such as Bluetooth® or Wi-Fi®.

The system controller 13 controls each unit of the image forming apparatus 1, performs data processing, and the like. For example, the system controller 13 includes a processor such as a CPU, a memory, and various interfaces. In the system controller 13, the processor executes a program stored in the memory to control each unit and perform data processing. The system controller 13 is connected to each part in the housing 11 by various internal interfaces, for example. For example, the system controller 13 is connected to the communication interface 12, the sheet feed cassette 14, the sheet discharge tray 15, the conveyance mechanism 16, the image forming mechanism 17, the fixing unit 18, the tag communication device 19, the scanner 20, and the like by a bus connection.

The system controller 13 acquires a print job including image data and the like from an external device via the communication interface 12. The image data included in the print job indicates an image to be formed on a sheet P. The image data may be data for forming an image on one sheet P or data for forming an image on a plurality of sheets P.

In addition, the print job may include information indicating the content of the tag process for the RFID tag 40 included in the sheet P. The content of the tag process for the RFID tag 40 may be instructed to write data to the RFID tag 40, or may be instructed to read data from the RFID tag 40. Further, the print job may include information indicating a sheet discharge position (i.e., the sheet discharge tray 15, a direction of discharge, and the like) at which the sheet P on which the image is formed is discharged. Further, the print job may include information indicating color printing or monochrome printing, and information indicating a printing condition such as a sheet size.

The system controller 13 includes an engine controller that controls the operation of the conveyance mechanism 16, the image forming mechanism 17, and the fixing unit 18. For example, the system controller 13 controls the conveyance of the sheet P by the conveyance mechanism 16. The system controller 13 controls the formation of the developer image by the image forming mechanism 17 and the transfer of the developer image to the sheet P. The system controller 13 controls the fixing of the developer image on the sheet P by the fixing unit 18. The system controller 13 controls the operations of the conveyance mechanism 16, the image forming mechanism 17, and the fixing unit 18 to form an image of the image data included in the print job on the sheet P.

Note that the image forming apparatus 1 may be configured to include an engine controller separately from the system controller 13. For example, the image forming apparatus 1 may include an engine controller that controls at least one of the conveyance mechanism 16, the image forming mechanism 17, the fixing unit 18, and the like separately from the system controller 13. In this case, the engine controller provided separately from the system controller 13 may acquire information necessary for control from the system controller 13.

Each of the sheet feed cassettes 14 is a cassette that stores a sheet P. The sheet feed cassette 14 can store either a regular sheet NP or a tagged sheet TP. For example, the sheet feed cassette 14 is able to be pulled out from the housing 11. The sheet feed cassette 14 is stored in the housing 11 after the regular sheet NP or the tagged sheet TP is replenished. As described above, the sheet feed cassette 14 in which the regular sheet NP is stored and the sheet feed cassette 14 in which the tagged sheet TP is stored are distinguished by the user in advance.

The conveyance mechanism 16 is a mechanism that conveys the sheet P in the image forming apparatus 1. As illustrated in FIG. 1, the conveyance mechanism 16 includes a plurality of conveyance paths. The conveyance mechanism 16 includes a sheet feed conveyance path 31 and a sheet discharge path 32.

The sheet feed conveyance path 31 and the sheet discharge path 32 are constituted by a plurality of rollers and a plurality of guides. The rollers are rotated by the power transmitted from the drive mechanism to convey the sheet P. The plurality of guides control the conveyance direction of the sheet P conveyed by the rollers.

The sheet feed conveyance path 31 takes in the sheet P from the sheet feed cassette 14 and supplies the taken-in sheet P to the image forming mechanism 17. The sheet feed conveyance path 31 includes a plurality of pickup rollers 33 respectively corresponding to the sheet feed cassettes 14. Each of the pickup rollers 33 feeds one sheet P to be taken out from the sheet feed cassette 14 to the sheet feed conveyance path 31.

The sheet feed conveyance path 31 supplies the sheet P to a transfer position of a toner image generated by the image forming mechanism 17 using toner (developer). The registration roller 36 is provided in front of the transfer position in the sheet feed conveyance path 31. The registration roller 36 feeds the sheet P fed from the sheet feed cassette 14 to the transfer position in accordance with the transfer timing of the image at the transfer position. For example, the registration roller 36 temporarily stops the sheet P fed from the sheet feed cassette 14. In the image forming apparatus 1, the tag communication device 19 installed in the vicinity of the registration roller 36 communicates with the tag sheet TP temporarily stopped here. The registration roller 36 feeds the sheet P to the transfer position at a timing corresponding to an instruction from the system controller 13.

The sheet discharge path 32 is a conveyance path for discharging the sheet P on which an image is formed by the image forming mechanism 17 from the housing 11. The sheet discharge path 32 discharges the sheet P to the sheet discharge tray 15. The sheet discharge tray 15 is a tray that receives the sheet P discharged from the image forming apparatus 1. When the image forming apparatus 1 includes a plurality of sheet discharge positions, the sheet discharge path 32 operates to discharge the sheet P to the sheet discharge position designated by the system controller 13.

The image forming mechanism 17 includes a configuration for forming an image on the sheet P. Details of the image forming mechanism 17 will be described later.

The fixing unit 18 includes a heat roller 34 and a pressure roller 35. The fixing unit 18 heats the sheet P conveyed through the sheet discharge path 32 by the heat roller 34 at a predetermined temperature. The fixing unit 18 further pressurizes the sheet P heated by the heat roller 34 by the pressure roller 35. The fixing unit 18 heats and pressurizes the sheet P to fix a developer image on the sheet P to the sheet P.

The tag communication device 19 communicates with a RFID tag 40, which is a wireless communication tag attached to or embedded in a tag sheet TP. The tag communication device 19 is installed in the vicinity of the registration roller 36, for example. The tag communication device 19 is installed so as to be able to communicate with the RFID tag 40 of the tag sheet TP conveyed to a position (i.e., upstream) in front of the registration roller 36 in the sheet feed conveyance path 31. However, the location of the registration roller 36 is not limited to this, and it is sufficient that the registration roller is installed in the vicinity of the conveyance path through which the tag sheet TP is conveyed.

The tag communication device 19 transmits a command to the RFID tag 40 by wireless communication. The RFID tag 40 executes a process corresponding to the command received from the tag communication device 19, and transmits (responds to) the result of executing the command to the tag communication device 19. The tag communication device 19 receives commands that are responses from RFID tag 40.

The tag communication device 19 reads data from the RFID tag 40 and writes data to the RFID tag 40 in response to an instruction from the system controller 13. When the system controller 13 instructs reading of data from the RFID tag 40, the tag communication device 19 executes a process of reading data from the RFID tag 40. When the system controller 13 instructs to write data to the RFID tag 40, the tag communication device 19 executes a process of writing data to the RFID tag 40.

The scanner 20 is a device that scans a document and converts it into image data. The scanner 20 is installed on an upper portion of the housing 11. The scanner 20 reads an image of a document set on a document platen glass provided on the upper portion of the housing 11. The scanners 20 include an auto document feeder (ADF). The scanners 20 also have a function of reading images of documents conveyed by the automated document feeder ADF.

The control panel 21 includes a touch panel 22, a keyboard 23, and the like. The touch panel 22 is, for example, a stack of a display such as a liquid crystal display (LCD) or an organic Electroluminescence (EL) display and a touch sensor that detects a touch input. The display including the touch panel 22 is a display device of the image forming apparatus 1.

For example, the touch panel 22 displays information indicating whether each sheet feed cassette 14 can be used. The availability of each sheet feed cassette 14 is different for each user who uses the image forming apparatus 1. For example, it is displayed on the touch panel 22 that the sheet feed cassette 14 in which the tag sheet TP is stored is usable or not usable according to the authentication result of the user.

The keyboard 23 includes various keys for the user of the image forming apparatus 1 to operate. For example, the keyboard 23 includes a numeric keypad, a power key, a sheet feed key, function keys, and the like. Each key may be referred to as a button. The touch panel 22 and the keyboard 23 are input devices of the image forming apparatus 1.

Next, the configuration of the image forming mechanism 17 will be described. As shown in FIG. 1, the image forming mechanism 17 includes a plurality of image forming stations 41 and a transfer mechanism 42. Each image forming station 41 forms a toner image. Each image forming station 41 is provided for each type of toner. In the example illustrated in FIG. 1, each image forming station 41 corresponds to each color toner such as yellow, magenta, cyan, and black from the left side. Each image forming station 41 comprises a toner cartridge 2 having color toner of the corresponding color. The image forming apparatus 1 illustrated in FIG. 1 includes four image forming stations 41 corresponding to four color toner of yellow, magenta, cyan, and black.

Next, the configuration of each image forming station 41 will be described. Each of the image forming stations 41 includes a photosensitive drum 71, a cleaner 72, a charger 73, an exposure unit 74, a developing unit 75, and a primary transfer roller (or a transfer device) 93.

The photosensitive drum 71 includes a cylindrical drum and a photosensitive layer formed on an outer peripheral surface of the drum. The photosensitive drum 71 is a photoconductor. The outer peripheral surface of the photosensitive drum 71 is an image bearing member. The photosensitive drum 71 rotates at a constant speed by the power transmitted from the drive mechanism.

The cleaner 72 has a blade in contact with the surface of the photosensitive drum 71. The cleaner 72 uses a blade to remove toner remaining on the surface of the photosensitive drum 71.

The charger 73 uniformly charges the surface of the photosensitive drum 71. The charger 73 charges the photosensitive drum 71 to a uniform negative potential by applying a grid bias voltage output from the grid electrode to the photosensitive drum 71.

The exposure unit 74 includes a plurality of light-emitting elements. The light-emitting element is, for example, a laser diode (LD), a light-emitting diode (LED), or an organic EL (OLED). The light emitting elements are arranged in a main scanning direction that is a direction parallel to the rotation axis of the photosensitive drum 71. Each light-emitting element irradiates a single point on the photosensitive drum 71 with light.

The exposure unit 74 irradiates the surface of the charged photosensitive drum 71 with light from the light emitting elements arranged in the main scanning direction, thereby forming an electrostatic latent image for one line on the photosensitive drum 71. Further, the exposure unit 74 continuously irradiates the rotating photosensitive drum 71 with light, thereby forming electrostatic latent images of a plurality of lines.

The developing unit 75 is a device for attaching toner to the photosensitive drum 71. The developing unit 75 contains a developer including toner and a carrier. The developing unit 75 stirs the toner supplied from the toner cartridge 2 and the carrier by a stirring mechanism. The developing unit 75 supplies toner to the photosensitive drum 71 from a developing roller to which a developer including toner and a carrier agitated by an agitating mechanism is adhered. The developing unit 75 develops the electrostatic latent image on the photosensitive drum 71 with toner by supplying the toner to the photosensitive drum 71. The photosensitive drum 71 holds a toner image (or a developer image) developed with toner by the developing unit 75. The photosensitive drum 71 rotates to send a toner image to a transfer position to a transfer belt 91.

The transfer mechanism 42 transfers the toner image formed on the surface of the photosensitive drum 71 to the sheet P. In the configuration example illustrated in FIG. 1, the transfer mechanism 42 includes a transfer belt 91, a drive roller 92, a plurality of primary transfer rollers 93, and a secondary transfer roller 94.

The transfer belt 91 is a medium to which a toner image formed on the surface of the photosensitive drum 71 of each image forming station 41 is transferred. The transfer belt 91 is an intermediate transfer member that holds an image to be transferred onto the sheet P. In the configuration example illustrated in FIG. 1, the transfer belt 91 is an endless belt wound around the drive roller 92 and a plurality of winding rollers. The rear surface of the transfer belt 91, which is the inner surface, is in contact with the drive roller 92 and the winding rollers. The outer surface of the transfer belt 91 faces the photosensitive drum 71 of each image forming station 41.

The drive roller 92 is rotated by power transmitted from the drive mechanism. The drive roller 92 rotates to convey the transfer belt 91. In the configuration example shown in FIG. 1, the drive roller 92 rotates counterclockwise. By the rotation of the drive roller 92, the transfer belt 91, which is an endless belt, is conveyed so as to rotate in a counterclockwise direction. The winding rollers are configured to be freely rotatable. The winding rollers rotate in accordance with the movement of the transfer belt 91 by the drive roller 92.

A plurality of primary transfer rollers 93 are provided for each image forming station 41. Each of the primary transfer rollers 93 is provided so as to face the photosensitive drum 71 of the corresponding image forming station 41. Each of the primary transfer rollers 93 is provided at a position opposed to the photosensitive drum 71 of the corresponding image forming station 41 with the transfer belt 91 interposed therebetween. A portion of the primary transfer roller 93 that faces the photosensitive drum 71 with the transfer belt 91 interposed therebetween is referred to as a primary transfer portion. In the primary transfer portion, a toner image on the photosensitive drum 71 is transferred to the transfer belt 91.

The primary transfer roller 93 is in contact with the inner peripheral surface side of the transfer belt 91. The primary transfer roller 93 presses the transfer belt 91 from the inner peripheral surface side toward the photosensitive drum 71. An outer peripheral surface of the transfer belt 91 pressed by the primary transfer roller 93 comes into contact with the photosensitive drum 71. When a toner image is transferred from the photosensitive drum 71, the primary transfer roller 93 applies a transfer bias (i.e., a primary transfer bias) to the photosensitive drum 71 via the transfer belt 91. The toner image is transferred from the photosensitive drum 71 to the transfer belt 91 by a transfer bias applied from the primary transfer roller 93.

The secondary transfer roller 94 is provided at a position facing the drive roller 92. The secondary transfer roller 94 is in contact with the surface of the transfer belt 91 on which the inner peripheral surface is conveyed by the drive roller 92. The secondary transfer roller 94 presses the transfer belt 91 toward the drive roller 92. A surface of the transfer belt 91 sandwiched between the drive roller 92 and the secondary transfer roller 94 is in close contact with the secondary transfer roller 94. A transfer nip is formed at a portion where the surface of the transfer belt 91 and the secondary transfer roller 94 come into close contact with each other. The transfer nip is a transfer portion that transfers the toner or developer image formed on the surface of the transfer belt 91 onto the sheet P.

The secondary transfer roller 94 conveys the sheet P supplied by the registration roller 36 in a state of being sandwiched between the sheet P and the transfer belt 91. The sheet P passes through the transfer nip or the transfer portion. The secondary transfer roller 94 presses the sheet P passing through the transfer nip against the surface of the transfer belt 91.

The secondary transfer roller 94 applies a bias voltage (i.e., a secondary transfer bias) to the transfer belt 91 via the sheet P at the transfer nip. The secondary transfer roller 94 applies the secondary transfer bias (hereinafter, also simply referred to as "the transfer bias") of a potential specified by the system controller 13. When the sheet P passes through the transfer nip in a state where the secondary transfer roller 94 applies the transfer bias, the toner image on the transfer belt 91 is transferred onto the sheet P.

As described above, the transfer mechanism 42 primarily transfers the toner image on the photosensitive drum 71 to the transfer belt 91 that comes into contact with the photosensitive drum 71 by the transfer bias applied from the primary transfer roller 93 in the primary transfer portion. When the image forming stations 41 are provided, the transfer mechanism 42 performs the primary transfer of the toner image from the photosensitive drum 71 of the image forming stations 41 to the transfer belt 91.

The transfer mechanism 42 sends the toner image primarily transferred onto the surface of the transfer belt 91 to the transfer nip. The transfer mechanism 42 transfers the toner image transferred onto the surface of the transfer belt 91 onto the sheet P that passes through a transfer nip to which the secondary transfer roller 94 applies a transfer bias. The transfer belt 91 is an example of an image carrier that holds a toner image to be transferred onto a sheet P.

Figure 3:
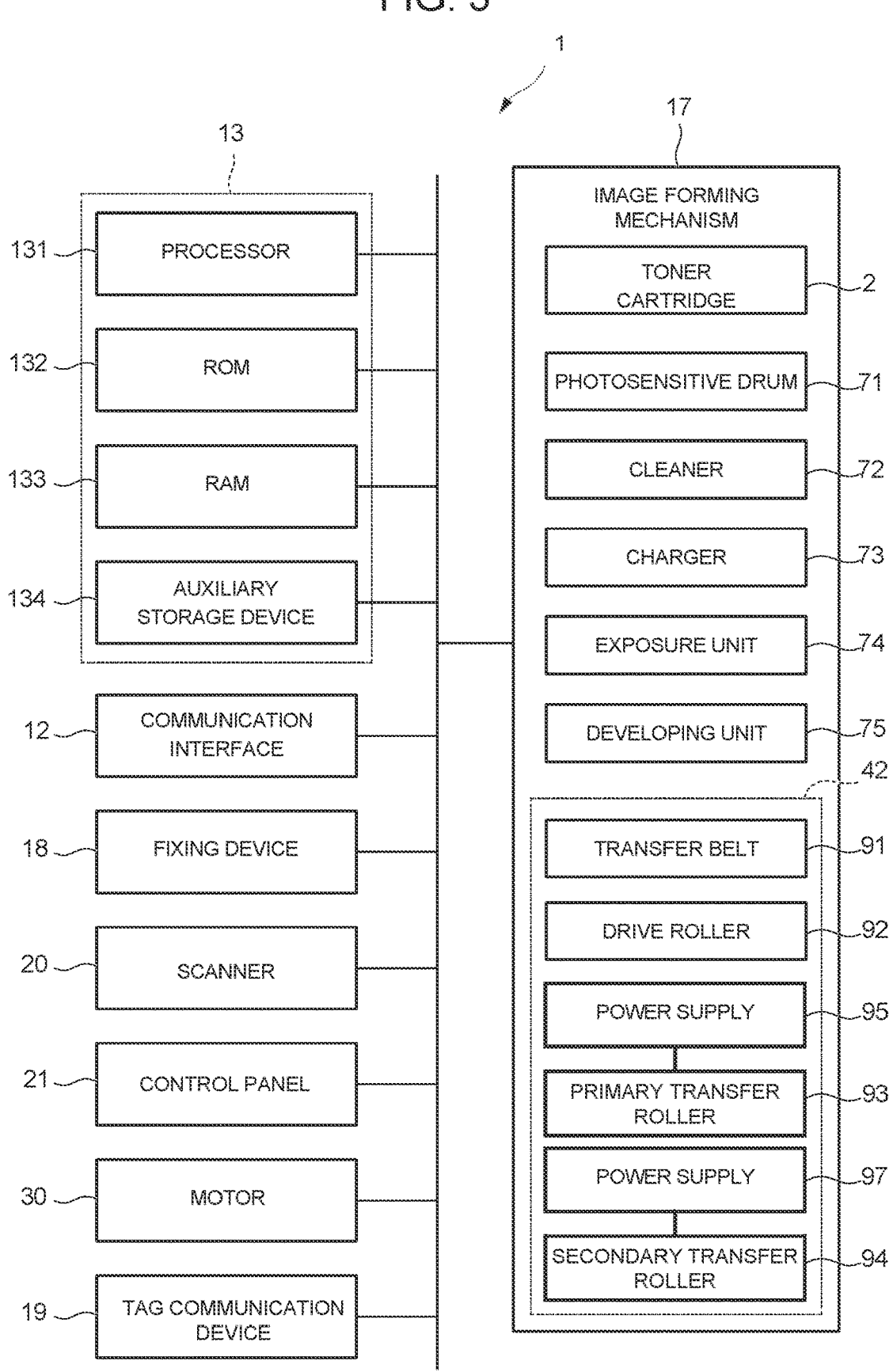
FIG. 3 is a block diagram of a hardware configuration of the image forming apparatus.

Next, a hardware configuration of the image forming apparatus 1 will be described with reference to FIG. 3 As illustrated in FIG. 3, the communication interface 12, the image forming mechanism 17, the fixing unit 18, the tag communication device 19, the scanner 20, the control panel 21, and the motor 30 are connected to the system controller 13 of the image forming apparatus 1.

The system controller 13 includes a processor 131, a read only memory (ROM) 132, a random access memory (RAM) 133, and an auxiliary storage device 134. The system controller 13 may include an application specific integrated circuit (ASIC) or the like for image processing.

The processor 131 controls each unit of the image forming apparatus 1 according to an operating system and application programs. The processor 131 is, for example, a CPU.

The ROM 132 is a non-volatile memory area, and the RAM 133 is a volatile memory area. The ROM 132 stores an operating system and application programs. The ROM 132 stores control data required for the processor 131 to execute a process for controlling each unit. The RAM 133 is used as a work area in which the processor 131 appropriately rewrites data. The RAM 133 has, for example, a work area for storing images.

The auxiliary storage device 134 includes a storage device such as an EEPROM, a hard disc drive (HDD), or a solid state drive (SSD), for example. The auxiliary storage device 134 stores data such as setting data used by the processor 131 to perform various processes. The auxiliary storage device 134 stores data generated by the processing executed by the processor 131. The auxiliary storage device 134 may store application programs.

Further, the auxiliary storage device 134 stores authentication information for authenticating a user who uses the image forming apparatus 1 and a user terminal 202. The authentication information is, for example, information in which a user identifier (ID) uniquely identifying the user and a password are associated with each other. The processor 131 executes a user authentication process by, for example, collating a user ID and a password transmitted from the user terminal 202 described later with the user ID and password stored in the auxiliary storage device 134.

The auxiliary storage device 134 further stores the attribute information for each user ID. The attribute information is information (for example, flag information) indicating whether each user is an administrator or privileged user. In one embodiment, the administrator is a user who is permitted to print on a tag sheet TP, and any users other than the administrator are not permitted to print on the tag sheet TP. Alternatively, the attribution information may be information (for example, flag information) indicating whether the user is permitted to print on the tag sheet TP. Alternatively, the attribution information may be information (for example, flag information) indicating whether the user is a user who frequently prints on the tag sheet TP (that is, whether the user is familiar with printing on the tag sheet TP).

The processor 131 performs various controls for permitting or prohibiting printing on the tag sheet TP based on, for example, the user ID and the attribution information of the authenticated user. For example, the control for prohibiting printing on the tag sheet TP is a control for switching to a display in which the user cannot select the sheet feed cassette 14 in which the tag sheet TP is stored on the selection screen of the sheet feed cassette 14 displayed on the control panel 21. Alternatively, for example, the control for prohibiting printing on the tag sheet TP is a control for outputting an alarm sound when the user attempts to select the sheet feed cassette 14 in which the tag sheet TP is stored on the selection window of the sheet feed cassette 14 displayed on the control panel 21. Alternatively, for example, the control for prohibiting printing on the tag sheet TP is a control for preventing the pickup roller 33 that picks up the tag sheet TP from the sheet feed cassette 14 when the user selects the sheet feed cassette 14 in which the tag sheet TP is stored and tries to execute printing.

Further, the processor 131 performs various kinds of control for prohibiting printing on the tag sheet TP, for example, when a copy instruction is given instead of printing. The control for prohibiting printing on the tag sheet TP is the same as the control performed on the basis of the user ID and the attribute information.

The system controller 13 is connected to the toner cartridge 2, the photosensitive drum 71, the cleaner 72, the charger 73, the exposure unit 74, and the developing unit 75 in each of the image forming stations 41. The system controller 13 controls the toner cartridge 2, the photosensitive drum 71, the cleaner 72, the charger 73, the exposure unit 74, and the developing unit 75.

For example, the system controller 13 controls on/off of charging the charger 73 of each image forming station 41. Further, for example, the system controller 13 controls on/off of irradiation of laser light to the photosensitive drum 71 with respect to the exposure unit 74 of each image forming station 41. Further, for example, the system controller 13 controls on/off of the development bias with respect to the developing unit 75 of each image forming station 41.

The system controller 13 is connected to the transfer mechanism 42. As described above, the transfer mechanism 42 includes the transfer belt 91, the drive roller 92, the primary transfer rollers 93, the secondary transfer roller 94, the power supply 95, and the power supply 97. Each of the primary transfer rollers 93 is provided in the corresponding image forming station 41.

The system controller 13 is connected to the registration roller 36. For example, the system controller 13 controls ON/OFF of the feeding of the sheet P to the transfer position by the registration roller 36 in accordance with the tag process performed on the RFID tag 40 of the sheet P. The registration roller 36 feeds the sheet P to the transfer position at a timing based on an instruction from the system controller 13.

The power supply 95 supplies a primary transfer bias applied by the primary transfer roller 93 to the photosensitive drum 71 facing the transfer belt 91. The power supply 95 may be a current source or a voltage source.

The power supply 95 is connected to the system controller 13. The system controller 13 controls on/off of the primary transfer bias applied to the photosensitive drum 71 to which the primary transfer roller 93 faces by the power supply 95. The system controller 13 controls the value of the primary transfer bias applied by the primary transfer roller 93 by the power supply 95.

The power supply 97 supplies a secondary transfer bias applied to the drive roller 92 that is opposed to the secondary transfer roller 94 across the transfer belt 91. The power supply 97 is connected to the system controller 13. The system controller 13 controls the value of the voltage for the secondary transfer bias applied to the transfer belt 91 by the secondary transfer roller 94 by the power supply 97. For example, the system controller 13 may determine the transfer biasing value based on the transfer setting according to the process performed on the RFID tag 40 of the tag sheet TP. The system controller 13 may adjust the value of the bias voltage according to the basis weight, thickness, type, or the like of the sheet P.

The motor 30 is a motor that operates each unit. The motor 30 is connected to the system controller 13. The motor 30 is driven in accordance with control from the system controller 13. The motor 30 includes, for example, a first motor, a plurality of second motors, and a third motor. The first motor drives the conveyance mechanism 16. Each of the second motors rotates the corresponding photosensitive drum 71. The third motor rotates the drive roller 92. A plurality of second motors are provided corresponding to the photosensitive drums 71 of the image forming stations 41. The motor 30 may include motors other than the first, second, and third motors.

Next, a configuration of the image forming system 200 including the image forming apparatus 1 and a server 201 according to an embodiment will be described.

The image forming apparatus 1 having the above-described configuration may be configured to be operated in the image forming system 200 including the server 201. For example, the server 201 operates as a management device that manages data recorded in the RFID tag 40 of the tag sheet TP in order to manage the tag sheet TP. The server 201 may instruct the image forming apparatus 1 to write data to the RFID tag 40 of the tag sheet TP.

The server 201 can manage history information about the processed tag sheet TP by storing the data written in the RFID tag 40 of the tag sheet TP by the image forming apparatus 1 together with the processed date and time. In addition, the server 201 acquires the data read by the image forming apparatus 1 from the RFID tag 40 of the tag sheet TP. The server 201 can manage the history of the processed tag sheet TP by storing data read by the image forming apparatus 1 from the RFID tag 40 of the tag sheet TP together with date and time information.

Hereinafter, an example of a configuration of the image forming system 200 including the image forming apparatus 1, the server 201, and a user terminal 202 will be described. FIG. 4 is a block diagram illustrating a functional configuration of the image forming system 200 including the image forming apparatus 1, the server 201, and the user terminal 202 according to an embodiment. In the configuration example illustrated in FIG. 4, the image forming apparatus 1 is an MFP having the configuration as illustrated in FIGS. 1 and 3.

As shown in FIG. 4, the server 201 includes a processor 211, a ROM 212, a RAM 213, a storage device 214, and a communication interface (I/F) 215.

The processor 211 is, for example, a CPU. The processor 211 executes various processes according to a program. For example, the processor 211 executes an operating system and application programs.

The ROM 212 is a non-volatile memory area. The ROM 212 is a volatile memory area. The ROM 212 stores, for example, an operating system and application programs. The ROM 212 stores control data required for the processor 211 to execute a process for controlling each unit. The RAM 213 is used as a work area in which the processor 211 appropriately rewrites data. The RAM 213 has, for example, a work area for storing images.

For example, the storage device 214 is an EEPROM, an HDD, or an SSD. The storage device 214 stores data such as setting data used by the processor 211 to perform various processes. The storage device 214 stores data generated by processing executed by the processor 211. The storage device 214 may store application programs.

As described above, the image forming apparatus 1 executes the user authentication process, but the server 201 may execute the user authentication process. In this case, the storage device 214 stores authentication information for authenticating the user using the image forming apparatus 1 and the user terminal 202. The authentication information is, for example, information in which a user ID uniquely identifying the user and a password are associated with each other.

In this case, the storage device 214 further stores attribute information for each user. As described above, the attribute information is a flag indicating whether each user is an administrator, information indicating whether the user is permitted to print on the tag sheet TP (for example, flag information), or information indicating whether the user often prints on the tag sheet TP (for example, whether the user is familiar with printing on the tag sheet TP).

The communication interface 215 is an interface circuit for communicating with other devices connected through a network. The communication interface 215 is used for communication with the image forming apparatus 1. The communication interface 215 is, for example, an interface for LAN communication. The communication interface 215 may be a wireless communication interface that communicates with other devices according to a wireless communication standard such as Bluetooth® or Wi-Fi®.

As shown in FIG. 4, the user terminal 202 includes a processor 221, a ROM 222, a RAM 223, a storage device

224, and a communication interface 225. The user terminal 202 is, for example, a terminal device such as a PC, a tablet terminal, or a smart phone.

The processor 221 is, for example, a CPU. The processor 221 executes various processes by executing a program. For example, the processor 221 executes an operating system or an application program.

The ROM 222 and the RAM 223 correspond to a main storage unit of a computer as the user terminal 202. The ROM 222 is a non-volatile memory area. The ROM 222 is a volatile memory area. The ROM 222 stores, for example, an operating system and application programs. The ROM 222 stores control data required for the processor 221 to execute a process for controlling each unit. The RAM 223 is used as a work area in which the processor 221 appropriately rewrites data. The RAM 223 has, for example, a work area for storing images.

For example, the storage device 224 is an EEPROM, an HDD, or an SSD. The storage device 224 stores data such as setting data used by the processor 221 to perform various processes. The storage device 224 stores data generated by processing executed by the processor 221. The storage device 224 may store application programs.

The storage device 224 stores, for example, information indicating a print job. The print job is print instruction information for instructing the image forming apparatus 1 to form an image on a sheet P. In addition, the storage device 224 may store, for example, information to be written in the RFID tag 40 included in the tag sheet TP processed by the image forming apparatus 1. In addition, the storage device 224 may store, for example, data read from the RFID tag 40 of the tag sheet TP by the image forming apparatus 1 together with information indicating the date and time of when the data has been read.

The communication interface 225 is a communication interface circuit for communicating with other devices connected through a network. The communication interface 225 is used for communication with the image forming apparatus 1. The communication interface 225 is, for example, an interface for LAN communication. The communication interface 225 may be a wireless communication interface that communicates with other devices according to a wireless communication standard such as Bluetooth® or Wi-Fi®.

Figure 5:
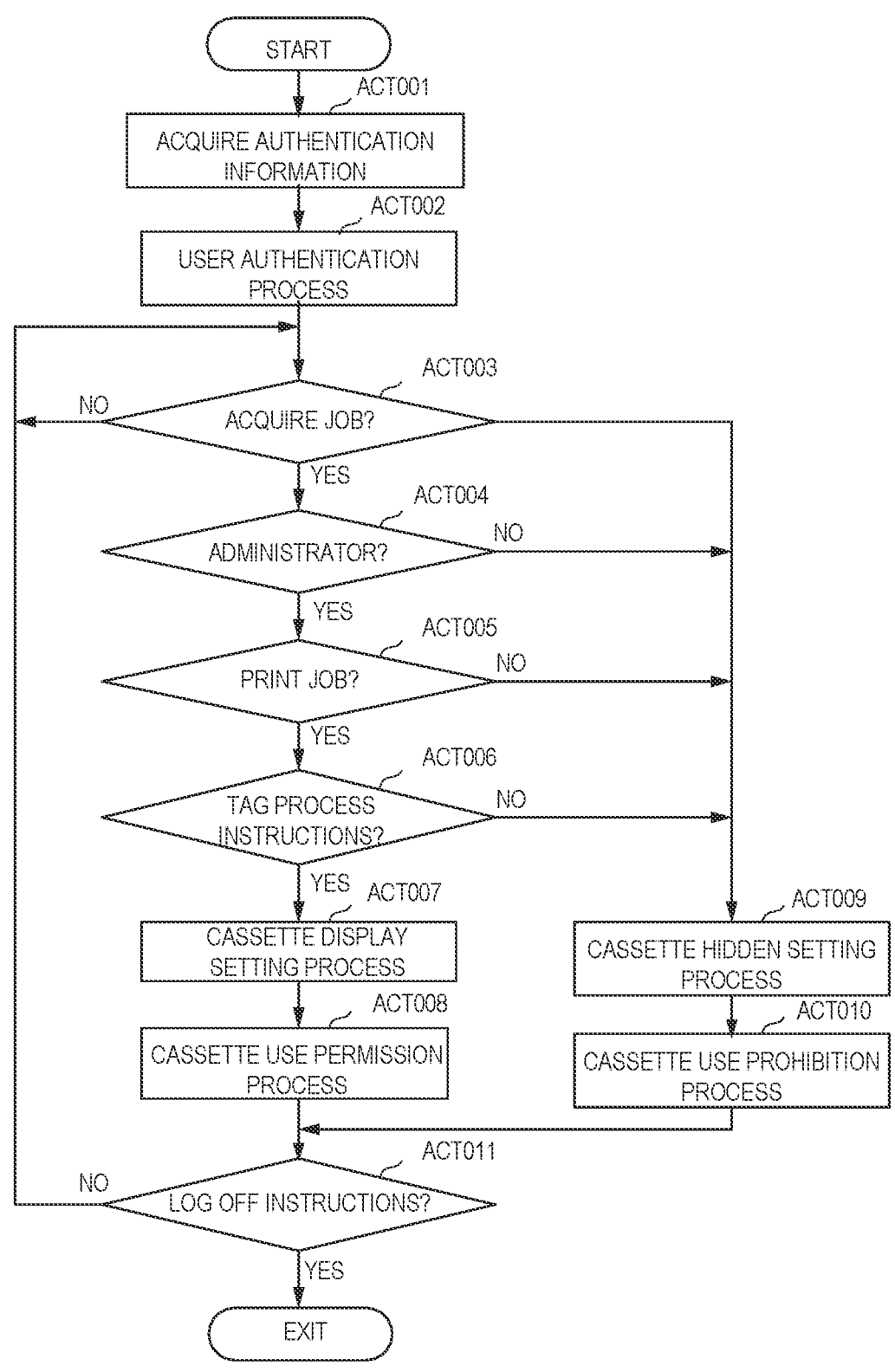
FIG. 5 is a flowchart of an operation of the image forming apparatus.

Hereinafter, an operation of the image forming apparatus 1 according to an embodiment for controlling the availability of the tag sheet TP will be described. FIG. 5 is a flowchart illustrating an operation of the image forming apparatus 1 according to an embodiment. The operation of the image forming apparatus 1 illustrated in the flowchart of FIG. 5 is started, for example, when authentication information of a user transmitted from his or her user terminal 202 or the server 201 via the network is transmitted to the image forming apparatus 1. Note that the operation of the image forming apparatus 1 illustrated in the flowchart of FIG. 5 may be started when the user inputs authentication information of the user to the control panel 21. The authentication information includes, for example, a user ID and a password.

First, the communication interface 12 or the control panel 21 of the image forming apparatus 1 acquires authentication information of the user. The communication interface 12 or the control panel 21 outputs the acquired authentication information to the system controller 13. The processor 131 of the system controller 13 acquires the authentication information output from the communication interface 12 or the control panel 21 (ACT001).

Next, the processor 131 reads the authentication information stored in advance in the auxiliary storage device 134. The processor 131 performs a user authentication process by collating the authentication information acquired from the communication interface 12 or the control panel 21 with the authentication information read from the auxiliary storage device 134 (ACT002). Here, it is assumed that authentication is successful. If the authentication fails, the operation of the image forming apparatus 1 illustrated in the flowchart of FIG. 5 ends.

The processor 131 further reads the attribute information of the user stored in advance in the auxiliary storage device 134. As described above, the attribute information indicates a flag indicating whether each user is an administrator or privileged user. The processor 131 determines whether the user is an administrator by reading the attribute information corresponding to the user ID of the user specified by the user authentication process.

As described above, the attribute information may be information (for example, flag information) indicating whether the user is permitted to print on the tag sheet TP. Alternatively, the attribution information may be information (for example, flag information) indicating whether the user frequently prints on the tag sheet TP (that is, whether the user is familiar with printing on the tag sheet TP). The processor 131 determines whether the user is permitted to print on the tag sheet TP or whether the user is likely to print on the tag sheet TP. That is, the processor 131 specifies whether the user specified by the user authentication process is permitted to execute the print with the tag process.

Next, the communication interface 12 or the control panel 21 waits for a job to be executed by the user (ACT003). Here, the job is a print job or a copy job. When the job is acquired (ACT003, YES), the communication interface 12 or the control panel 21 outputs the job to the system controller 13. The processor 131 of the system controller 13 acquires the job output from the communication interface 12 or the control panel 21.

Next, the processor 131 checks whether the user specified by ACT002 process is an administrator (ACT004). When the attribute of the user is an administrator (ACT004, YES), the processor 131 checks whether the job acquired by ACT003 process is a print job (not a copy job) (ACT005). If the acquired job is a print job (ACT005, YES), the processor 131 checks whether the acquired print job includes an instruction to execute the tag process (ACT006). When the acquired print job includes an instruction to execute tag process (ACT006, YES), the processor 131 performs subsequent processing (ACT007-ACT008) for enabling the sheet feed cassette 14 in which the tag sheet TP is stored.

The processor 131 performs display control of the control panel 21. For example, the processor 131 causes the control panel 21 to display an operation button for enabling selection of the sheet feed cassette 14 in which the tag sheet TP is stored.

Figure 6:
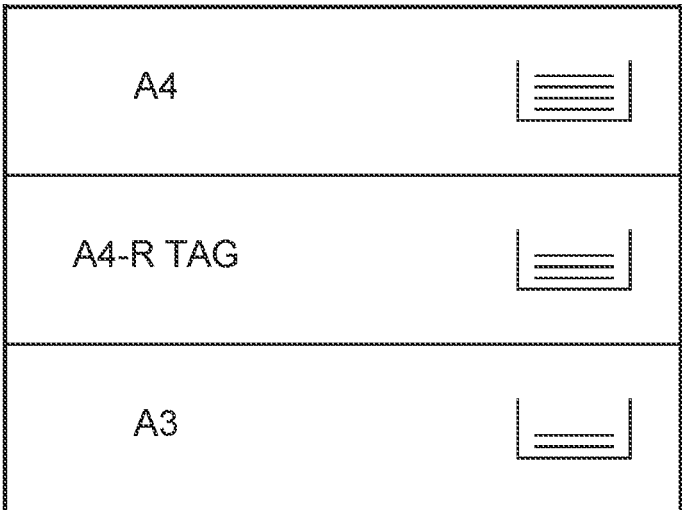
FIG. 6 is a diagram illustrating an example of a sheet feed cassette selection screen displayed by the image forming apparatus.

FIG. 6 is a diagram illustrating an example of a sheet feed cassette selection screen displayed on the control panel 21 of the image forming apparatus 1 according to an embodiment. In the sheet feed cassette selection screen shown in FIG. 6, three images of the sheet feed cassettes are displayed, each of which is marked with "A4", "A4-R tag", and "A3". The image marked with "A4" represents a sheet feed cassette 14 in which an A4 size regular sheet NP is stored. In addition, the image marked with "A4-R tag" represents a sheet feed cassette 14 in which the tag sheet TP of A4 size is stored. In addition, the image marked with "A3" represents a sheet feed cassette 14 in which an A3 size regular sheet NP is stored.

In the sheet feed cassette selection screen shown in FIG. 6, all three sheet feed cassettes 14 are displayed so as to be able to easily recognize that they can be selected (e.g., without the image being hidden or grayed out). As described above, when the tag process is permitted, the processor 131 causes the control panel 21 to display an operation button that enables the sheet feed cassette 14 of the "A4-R tag" in which the tag sheet TP is stored to be selected (ACT007).

Next, the processor 131 executes a process for permitting use of the sheet feed cassette 14 in which the tag sheet TP is stored (ACT008). The process for permitting the use of the sheet feed cassette 14 in which the tag sheet TP is stored is, for example, a control process for enabling the pickup roller 33 that picks up the tag sheet TP from the sheet feed cassette 14. Alternatively, the process for permitting the use of the sheet feed cassette 14 in which the tag sheet TP is stored is, for example, a control process that enables the sheet feed cassette 14 to be pulled out so that the tag sheet TP can be replenished.

Note that the process for permitting the use of the sheet feed cassette 14 in which the tag sheet TP is stored may be executed only by one type of process, or may be executed by a plurality of types of process. Further, the process of ACT008, which is a process for permitting the use of the sheet feed cassette 14 in which the tag sheet TP is stored, may be omitted.

On the other hand, in a case where the attribute of the user indicates that the user is not an administrator but a general, unprivileged user (ACT004, NO), in a case where the acquired job is not a print job but a copy job (ACT005, NO), or in a case where the acquired print job does not include an instruction to execute the tag process (ACT006, NO), the processor 131 performs a subsequent process (ACT009-ACT010) for disabling the sheet feed cassette 14 in which the tag sheet TP is stored.

The processor 131 performs display control of the control panel 21. For example, the processor 131 causes the control panel 21 to display an operation button for disabling the sheet feed cassette 14 in which the tag sheet TP is stored.

Figure 7:
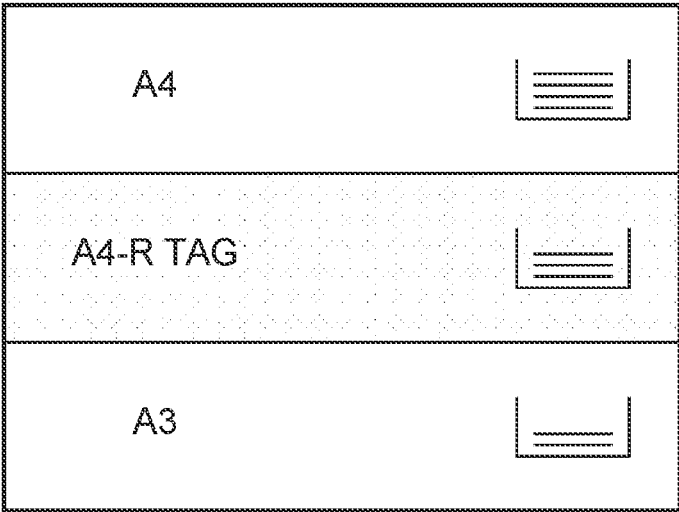
FIG. 7 is a diagram illustrating another example of the sheet feed cassette selection screen.

FIG. 7 is a diagram illustrating an example of a sheet feed cassette selection screen displayed on the control panel 21 of the image forming apparatus 1 according to an embodiment. Similarly to the sheet feed cassette selection screen shown in FIG. 6, the sheet feed cassette selection screen shown in FIG. 7 displays images of three sheet feed cassettes that are combined with "A4", "A4-R tag", and "A3".

In the sheet feed cassette selection screen shown in FIG. 7, unlike the sheet feed cassette selection screen shown in FIG. 6 described above, only the sheet feed cassette 14 of the "A4-R tag" in which the tag sheet TP is stored among the three sheet feed cassettes 14 is grayed out. As a result, the user can easily recognize that the sheet feed cassette 14 of the "A4-R tag" in which the tag sheet TP is stored cannot be selected. As described above, when the tag process is prohibited, the processor 131 hides or grays out the operation button for selecting the sheet feed cassette 14 of the "A4-R tag" in which the tag sheet TP is stored on the control panel 21 (ACT009).

Next, the processor 131 executes a process for prohibiting the use of the sheet feed cassette 14 in which the tag sheet TP is stored (ACT010). The process for prohibiting the use of the sheet feed cassette 14 in which the tag sheet TP is stored is, for example, a control process for preventing the pickup roller 33 that picks up the tag sheet TP from the sheet feed cassette 14 from operating. Alternatively, the process for prohibiting the use of the sheet feed cassette 14 in which the tag sheet TP is stored is, for example, a control process for preventing the sheet feed cassette 14 from being pulled out so that the tag sheet TP is not replenished.

Note that the process for prohibiting the use of the sheet feed cassette 14 in which the tag sheet TP is stored may be performed only by one type of process, or may be performed by a plurality of types of process. In addition, the process of ACT010, which is a process for prohibiting the use of the sheet feed cassette 14 in which the tag sheet TP is stored, may be omitted.

Next, the processor 131 controls the image forming mechanism 17 to perform the image forming process according to the acquired print job or copy job. In addition, when the execution of the tag processing is permitted, the processor 131 controls the tag communication device 19 to perform the tag processing on RFID tag provided in the tag sheet TP.

Next, the processor 131 checks whether an instruction to log off has been input by the user (ACT011). If a logoff instruction has not been entered (ACT011, NO), the process returns to ACT008 process, and the processor 131 waits for a job to be acquired. On the other hand, when the logoff instruction is inputted (ACT011, YES), the processor 131 executes the logoff process. As described above, the operation of the image forming apparatus 1 related to the control of the availability of the tag sheet TP illustrated in the flow chart of FIG. 5 is completed.

As described above, the image forming apparatus 1 prevents the sheet feed cassette 14 in which the tag sheet TP is stored from being used when the user specified by the user authentication is not permitted to execute a print job accompanied by the tag process. With such a configuration, the image forming apparatus 1 can prevent, for example, a user who is unfamiliar with handling of the tag sheet TP from setting the tag sheet TP in the sheet feed cassette 14 in an incorrect plane or orientation before executing the tag process. In addition, the image forming apparatus 1 prevents the tag processing from being executed when an instruction to execute a copy job is issued instead of a print job. With such a configuration, the image forming apparatus 1 can prevent the tag sheet TP from being used in a copy job in which the tag process is not generally required. Accordingly, the image forming apparatus 1 can reduce the occurrence of the tag process and the failure of the image forming with respect to the tag sheet TP.

According to the above-described embodiments, the image forming apparatus 1 includes a first sheet feed cassette 14, a second sheet feed cassette 14, an image forming mechanism 17, a communication interface 12, and a system controller 13. For example, the first sheet feed cassette 14 stores a regular sheet NP, and the second sheet feed cassette 14 stores a tag sheet TP.

The image forming mechanism 17 forms an image on the regular sheet NP or the tag sheet TP. The communication interface 12 communicates with a wireless tag such as an RFID tag 40 attached to the tag sheet TP. The controller 13 acquires attribute information of a user specified by user authentication, and controls availability of the tag sheet TP stored in the second sheet feed cassette 14 according to the acquired attribute information.

The image forming apparatus 1 may further include a control panel 21. The control panel 21 displays a sheet feed cassette selection screen for allowing the user to select a sheet feed cassette to be used. In addition, when performing the control of prohibiting the use of the tag sheet TP, the system controller 13 causes the control panel 21 to display a sheet feed cassette selection screen in which the selection of the second sheet feed cassette 14 is disabled. For example, in such a sheet feed cassette selection screen, the display of the second sheet feed cassette 14 in which the tag sheet TP is stored is hidden or grayed out, as shown in FIG. 7.

In the above-described image forming apparatus 1, when the control of prohibiting the use of the tag sheet TP is performed, the system controller 13 may control the conveyance unit so that the conveyance of the tag sheet TP stored in the second sheet feed cassette 14 is not performed. For example, controlling the conveyance unit so that the tag sheet TP stored in the second sheet feed cassette 14 is not conveyed means performing control so as not to operate the pickup roller 33 that picks up the tag sheet TP from the sheet feed cassette 14 in which the tag sheet TP is stored.

In the above-described image forming apparatus 1, the system controller 13 may perform control to prohibit the use of the tag sheet TP when the acquired job is a job instructing the copying process.

In the above-described image forming apparatus 1, the system controller 13 may perform control to permit the use of the tag sheet TP when the attribute information indicates that the user specified by the user authentication is an administrator, the attribute information indicates that the user specified by the user authentication is permitted to use the tag sheet TP, or the attribute information indicates that the user specified by the user authentication often uses the tag sheet TP.

A part of the functions of the image forming apparatus 1 may be executed by a processor according to one or more programs. In this case, the programs may be recorded in a computer-readable recording medium, and the programs recorded in the recording medium may be copied to a computer system and executed. Here, the "computer system" includes hardware such as an operating system and a peripheral device. In addition, the "computer-readable recording medium" refers to a portable medium such as a flexible disk, a magneto-optical disk, or a CD-ROM, or a storage device such as a hard disk built in a computer system. Further, the "computer-readable recording medium" may include a medium that stores the programs such as a volatile memory inside a computer system serving as a server or a client in that case.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus comprising:
an image forming mechanism;
a wireless tag communication device;
a display;
a first sheet feed cassette in which a sheet without a wireless tag is stored;
a second sheet feed cassette in which a sheet with a wireless tag is stored;
a memory that stores information indicating a user in association with an attribute thereof; and
a controller configured to:

acquire a job for forming an image on a sheet using the image forming mechanism,
identify a user who has issued the job,
determine whether the job includes a tag process for reading or writing data from or to a wireless tag attached to a sheet using the wireless tag communication device,
upon determining that the job includes the tag process, determine whether to execute the tag process based on the attribute of the identified user,
upon determining to execute the tag process, control the display to display a first screen that allows the user to select either the first sheet feed cassette or the second sheet feed cassette to be used for the job, and
upon determining not to execute the tag process, control the display to display a second screen that allows the user to select the first sheet feed cassette only.

2. The image forming apparatus according to claim 1, wherein the attribute indicates whether the user is permitted to execute the tag process.

3. The image forming apparatus according to claim 1, wherein
the first screen shows a first image of the first sheet feed cassette and a second image of the second sheet feed cassette, both of which are selectable, and
the second screen shows the first image that is selectable and the second image that is not selectable.

4. The image forming apparatus according to claim 3, wherein the second image in the second screen is grayed out.

5. The image forming apparatus according to claim 1, wherein the controller is configured to:
determine whether the job is a copy job or a print job, and
upon determining that the job is a copy job, determine not to execute the tag process regardless of the attribute of the identified user.

6. The image forming apparatus according to claim 5, wherein the controller is configured to, upon determining that the job is a print job, determine whether the job includes the tag process.

7. The image forming apparatus according to claim 1, wherein the attribute is represented by a value indicating whether the user frequently uses a sheet with a wireless tag.

8. A method performed by an image forming apparatus that includes an image forming mechanism and a wireless tag communication device, the method comprising:
storing, in a memory, information indicating a user in association with an attribute thereof;
acquiring a job for forming an image on a sheet using the image forming mechanism;
identifying a user who has issued the job;
determining whether the job includes a tag process for reading or writing data from or to a wireless tag attached to a sheet using the wireless tag communication device;
upon determining that the job includes the tag process, determining whether to execute the tag process based on the attribute of the identified user;
upon determining to execute the tag process, displaying a first screen that allows the user to select either a first sheet feed cassette in which a sheet without a wireless tag is stored or a second sheet feed cassette in which a sheet with a wireless tag is stored to be used for the job; and
upon determining not to execute the tag process, displaying a second screen that allows the user to select the first sheet feed cassette only.

9. The method according to claim 8, wherein the attribute indicates whether the user is permitted to execute the tag process.

10. The method according to claim 8, wherein the first screen shows a first image of the first sheet feed cassette and a second image of the second sheet feed cassette, both of which are selectable, and the second screen shows the first image that is selectable and the second image that is not selectable.

11. The method according to claim 10, wherein the second image in the second screen is grayed out.

12. The method according to claim 8, further comprising:

determining whether the job is a copy job or a print job; and upon determining that the job is a copy job, determining not to execute the tag process regardless of the attribute of the identified user.

13. The method according to claim 12, wherein whether the job includes the tag process is determined when the job is a print job.

14. The method according to claim 8, wherein the attribute is represented by a flag indicating whether the user frequently uses a sheet with a wireless tag.

15. An image forming system comprising:

a user terminal; and an image forming apparatus including:

an image forming mechanism, a wireless tag communication device, a display, a first sheet feed cassette in which a sheet without a wireless tag is stored, and a second sheet feed cassette in which a sheet with a wireless tag is stored, the image forming apparatus being configured to:

store information indicating a user of the user terminal in association with an attribute thereof, acquire, from the user terminal, a job for forming an image on a sheet using the image forming mechanism, identify the user who has issued the job through the user terminal, determine whether the job includes a tag process for reading or writing data from or to a wireless tag attached to a sheet using the wireless tag communication device, upon determining that the job includes the tag process, determine whether to execute the tag process based on the attribute of the identified user, upon determining to execute the tag process, display a first screen that allows the user to select either the first sheet feed cassette or the second sheet feed cassette to be used for the job, and upon determining not to execute the tag process, display a second screen that allows the user to select the first sheet feed cassette only.

16. The image forming system according to claim 15, wherein the attribute indicates whether the user is permitted to execute the tag process.

17. The image forming system according to claim 15, wherein the first screen shows a first image of the first sheet feed cassette and a second image of the second sheet feed cassette, both of which are selectable, and the second screen shows the first image that is selectable and the second image that is not selectable.

* * * * *